(12) United States Patent  (10) Patent No.: US 10,220,770 B2
Son et al.                  (45) Date of Patent:     Mar. 5, 2019

(54) GUIDE LAMP FOR VEHICLE

(71) Applicant: SL Corporation, Daegu (KR)

(72) Inventors: Youngho Son, Gyeongsangbuk-Do
(KR); Byoungki Ji, Gyeongsangbuk-Do
(KR); Jaiek Lee, Gyeongsangbuk-Do
(KR); Jin Young Jung,
Gyeongsangbuk-Do (KR)

(73) Assignee: SL Corporation, Daegu (KR)

( * ) Notice: Subject to any disclaimer, the term of this patent is extended or adjusted under 35 U.S.C. 154(b) by 730 days.

(21) Appl. No.: 14/333,478

(22) Filed: Jul. 16, 2014

(65) Prior Publication Data

US 2014/0328071 A1    Nov. 6, 2014

Related U.S. Application Data

(63) Continuation-in-part of application No. 13/313,758, filed on Dec. 7, 2011, now abandoned.

(30) Foreign Application Priority Data

Jul. 8, 2011   (KR) .................. 10-2011-0067885
Jul. 16, 2013  (KR) .................. 10-2013-0083654
Dec. 20, 2013  (KR) .................. 10-2013-0159866

(51) Int. Cl.
  *B60Q 1/00*   (2006.01)
  *F21V 21/28*  (2006.01)
  (Continued)

(52) U.S. Cl.
  CPC ............. *B60Q 1/525* (2013.01); *B60Q 1/346*
  (2013.01); *F21S 41/143* (2018.01);
  (Continued)

(58) Field of Classification Search
  CPC ............... F21S 48/1159; F21S 48/1275; F21S
  48/1283; F21S 48/1291; F21S 48/1225;
  (Continued)

(56) References Cited

U.S. PATENT DOCUMENTS 5,172,972 A    12/1992  Terao
5,373,426 A *  12/1994  O'Sullivan ............ B60Q 1/442
                                              340/467
(Continued)

FOREIGN PATENT DOCUMENTS

DE    102008005488 A1   7/2009
EP         2233356 A1   9/2010
(Continued)

OTHER PUBLICATIONS

Chinese Third Office Action dated Jul. 21, 2015, in Chinese Application No. 2011-10456530.3 (11 Pages).
(Continued)

*Primary Examiner* — Erin Kryukova
(74) *Attorney, Agent, or Firm* — Mintz Levin Cohn Ferris Glovsky and Popeo, P.C.; Kongsik Kim; Jhongwoo Jay Peck

(57) ABSTRACT

A guide lamp for a vehicle is provided that guides nearby vehicles or pedestrians as to the path of a vehicle. The guide lamp includes a sensing unit that is configured to sense a path change attempt of the vehicle and a lamp unit that is configured to generate a road beam pattern indicating a direction toward the path change of the vehicle. The lamp unit includes one or more light sources and a light emitter that is configured to generate the road beam pattern by emitting light generated by the light sources in two or more different directions.

10 Claims, 23 Drawing Sheets

(51) Int. Cl.
  *F21V 21/29* (2006.01)
  *F21V 5/00* (2018.01)
  *B60Q 1/26* (2006.01)
  *F21V 23/04* (2006.01)
  *G03B 21/00* (2006.01)
  *B60Q 1/52* (2006.01)
  *B60Q 1/34* (2006.01)
  *F21S 41/143* (2018.01)
  *F21S 41/20* (2018.01)
  *F21S 41/255* (2018.01)
  *F21S 41/32* (2018.01)

(52) U.S. Cl.
  CPC ........... *F21S 41/255* (2018.01); *F21S 41/285* (2018.01); *F21S 41/321* (2018.01); *B60Q 2400/50* (2013.01)

(58) Field of Classification Search
  CPC ............... F21S 48/1258; F21S 48/1154; F21S 48/1241; F21S 48/1323; F21S 41/24; F21S 41/25; F21S 41/255; F21S 41/265; F21S 41/275; F21S 43/145; F21S 43/235; F21S 43/236; F21S 43/242; F21S 43/247; F21S 43/26; F21S 41/143; F21S 41/285; F21S 41/321; B60Q 1/525; B60Q 1/346; B60Q 2400/50; B60Q 2300/45; G02B 21/2033
  USPC .......................................................... 353/13
  See application file for complete search history.

(56) References Cited

U.S. PATENT DOCUMENTS

| | | | |
|---|---|---|---|
| 5,682,138 A * | 10/1997 | Powell | ................... B60Q 1/326 340/431 |
| 5,707,129 A | 1/1998 | Kobayashi | |
| 5,921,671 A * | 7/1999 | Okuchi | ................... F21S 41/24 362/511 |
| 6,422,728 B1 | 7/2002 | Riggin | |
| 6,547,424 B2 | 4/2003 | Hasumi et al. | |
| 6,733,134 B2 | 5/2004 | Bleiner | |
| 6,752,508 B2 | 6/2004 | Kobayashi | |
| 6,967,593 B2 | 11/2005 | Carroll | |
| 7,150,547 B2 | 12/2006 | Okawa | |
| 8,070,332 B2 | 12/2011 | Higgins-Luthman et al. | |
| 8,325,027 B2 | 12/2012 | Tee et al. | |
| 9,732,923 B2 * | 8/2017 | Schug | .................. F21S 48/1154 |
| 2001/0030870 A1 | 10/2001 | Hiramatsu et al. | |
| 2003/0147247 A1 | 8/2003 | Koike | |
| 2004/0114381 A1 | 6/2004 | Salmeen et al. | |
| 2004/0207519 A1 * | 10/2004 | Tracy | ..................... A61H 3/061 340/467 |
| 2005/0117364 A1 | 6/2005 | Rennick et al. | |
| 2006/0044818 A1 | 3/2006 | Amagasa | |
| 2007/0053195 A1 | 3/2007 | Alberti | |
| 2007/0222574 A1 * | 9/2007 | Courts | ..................... B60Q 1/24 340/468 |
| 2007/0280503 A1 | 12/2007 | Kubota et al. | |
| 2008/0175012 A1 | 7/2008 | Shimaoka et al. | |
| 2011/0128141 A1 | 6/2011 | Purks et al. | |
| 2011/0169410 A1 | 7/2011 | Dassanayake et al. | |
| 2014/0203923 A1 * | 7/2014 | Lai | ........................... B62J 6/001 340/432 |
| 2015/0023043 A1 * | 1/2015 | Yang | ........................ B60Q 1/22 362/521 |
| 2015/0353000 A1 * | 12/2015 | Kowatzki | ................ B60Q 1/24 315/77 |

FOREIGN PATENT DOCUMENTS

| | | | |
|---|---|---|---|
| FR | 2923777 A1 | | 5/2009 |
| JP | H07245003 A | | 9/1995 |
| JP | 2778270 B2 | | 7/1998 |
| JP | 2003212033 A | | 7/2003 |
| JP | 36925446 | | 9/2005 |
| JP | 2006040707 A | | 2/2006 |
| JP | 2008143510 A | | 6/2008 |
| JP | 2009087584 A | * | 4/2009 |
| JP | 2009087584 A | | 4/2009 |
| JP | 2012119219 A | | 6/2012 |
| JP | 2013101985 A | | 5/2013 |

OTHER PUBLICATIONS

Office action issued in Chinese Application No. 201110456530.3 dated May 5, 2014. (Chinese original and English translation).
Search report issued in European Application No. 1101284.5 dated Jul. 2, 2012.

* cited by examiner

132

GUIDE LAMP FOR VEHICLE

CROSS-REFERENCES TO RELATED APPLICATIONS

This application is a continuation in part application of U.S. application Ser. No. 13/313,758 filed on Dec. 7, 2011, which claims priority to Korean Patent Application No. 10-2011-0067885 filed on Jul. 8, 2011. This application also claims priority to Korean Application No. 10-2013-0083654 filed on Jul. 16, 2013 and No. 10-2013-0159866 filed on Dec. 20, 2013. The afore-mentioned applications are incorporated herein by reference.

BACKGROUND

1. Field of the Invention

The invention relates to a guide lamp for a vehicle, and more particularly, to a guide lamp for a vehicle, that provides guidance along a path of a vehicle to the drivers of nearby vehicles or nearby pedestrians.

2. Description of the Related Art

Many vehicles today are equipped with lamps or lights for illuminating nearby objects for night-time driving (e.g., during poor lighting conditions) or signaling nearby vehicles or pedestrians as to a state of driving. For example, headlights and fog lights are mainly for illuminating purposes, and turn signal lights, taillights, brake lights, and side marker lights are mainly for signaling purposes. Turn signal lights are disposed at the front left, front right, rear left and rear right sides, respectively, of a vehicle and are turned on to signal to the drivers of nearby vehicles or nearby pedestrians of a lane change or a left turn or right turn at an intersection in advance, thereby avoiding accidents.

More specifically, in response to an attempted lane change, lamps of turn signal lights on the side of the vehicle along the path of the vehicle based on the lane change may be turned on and may be configured to flash according to a driver manipulation or the driving state of the vehicle, thereby alerting the drivers of nearby vehicles or nearby pedestrians to the direction of the lane change lanes or turn at an intersection. However, vehicles or pedestrians may not be able to easily detect and identify the flashing turn signal lights of the vehicle when located in, for example, a blind spot of the vehicle. Therefore, a method is needed to provide guidance as to whether and what direction the path of a vehicle is to be changed to the drivers of nearby vehicles or nearby pedestrians to facilitate recognition of the turn signal lights of the vehicle.

SUMMARY

Exemplary embodiments of the invention provide a guide lamp for a vehicle, which generates a road beam pattern indicating the direction toward which the path of a vehicle is to be changed and may thus allow the drivers of nearby vehicles or nearby pedestrians to more easily detect and recognize in advance that the changing path of the vehicle even from a location of obstructed view of the turn signal lights of the vehicle.

Exemplary embodiments of the invention also provide a guide lamp for a vehicle, in which a single lamp unit is configured to generate a plurality of beam patterns as a road beam pattern to simplify the structure of the guide lamp. However, exemplary embodiments of the invention are not restricted to those set forth herein. The above and other exemplary embodiments of the invention will become more apparent to one of ordinary skill in the art to which the invention pertains by referencing the detailed description of the invention given below.

According to an exemplary embodiment of the invention, a guide lamp for a vehicle may include: a sensing unit configured to sense a lane change attempt of a vehicle; and a lamp unit configured to generate a road beam pattern indicating a direction toward a path of the lane change. The lamp unit may include one or more light sources and a light emitter configured to generate the road beam pattern by allowing light generated by the light sources to be emitted in two or more different directions.

According to the exemplary embodiments, in response to a lane change attempt (e.g., changing the path of the vehicle), a road beam pattern may be generated that indicates the direction of the lane change path. As a result, the drivers of nearby vehicles or nearby pedestrians may detect more easily and recognize in advance the changing path of the vehicle, even from a location having obstructed views of the turn signal lights of the vehicle. In addition, since a single lamp unit may be configured to generate a plurality of beam patterns as a road beam pattern, it may be possible to address various problems such as spatial restrictions and increases in the number of parts and the manufacturing cost of a guide lamp for a vehicle.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION

Figure 1:
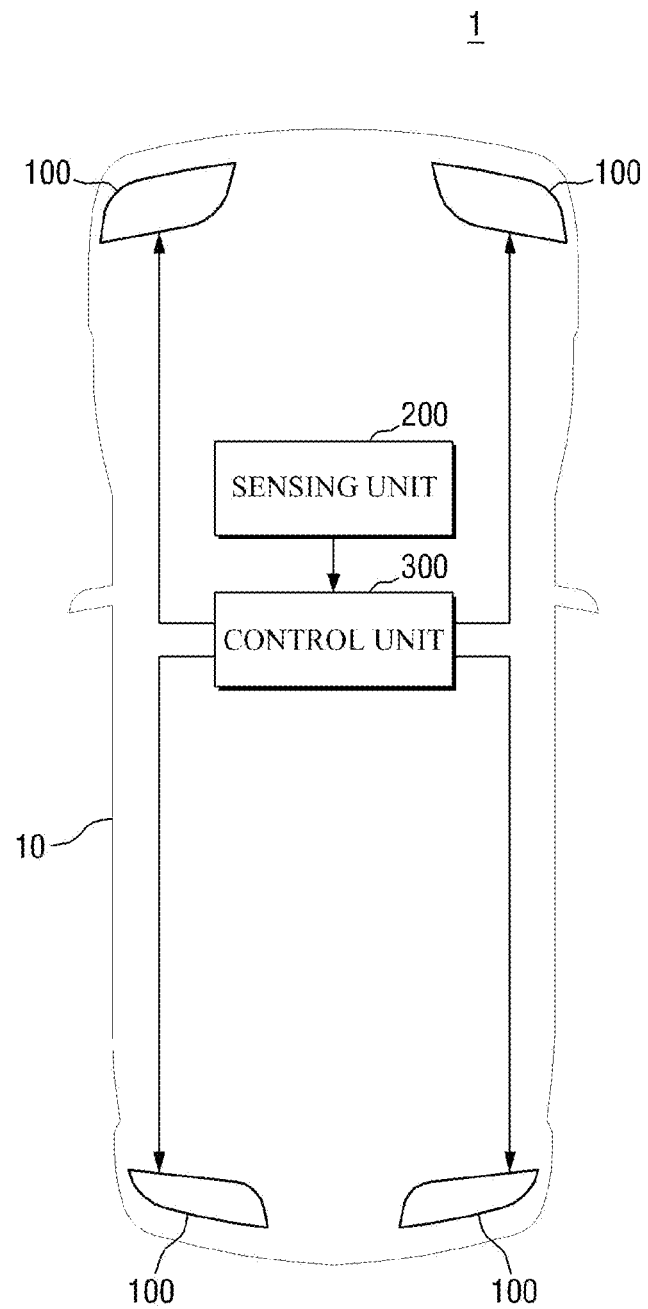
FIG. 1 is an exemplary diagram of a guide lamp for a vehicle, according to an exemplary embodiment of the invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Advantages and features of the invention and methods of accomplishing the same may be understood more readily by reference to the following detailed description of exemplary embodiments and the accompanying drawings. The invention may, however, be embodied in many different provides and should not be construed as being limited to the exemplary embodiments set forth herein. Rather, these exemplary embodiments are provided so that this disclosure will be thorough and complete and will fully convey the concept of the invention to those skilled in the art, and the invention will only be defined by the appended claims. Like reference numerals refer to like elements throughout the specification.

The exemplary embodiments and features of the invention and methods for achieving the exemplary embodiments and features will be apparent by referring to the exemplary embodiments to be described in detail with reference to the accompanying drawings. However, the invention is not limited to the exemplary embodiments disclosed hereinafter, but can be implemented in diverse provides. The matters defined in the description, such as the detailed construction and elements, are nothing but specific details provided to assist those of ordinary skill in the art in a comprehensive understanding of the invention, and the invention is only defined within the scope of the appended claims.

The term "on" that is used to designate that an element is on another element or located on a different layer or a layer includes both a case where an element is located directly on another element or a layer and a case where an element is located on another element via another layer or still another element. In the entire description of the invention, the same drawing reference numerals are used for the same elements across various figures. Although the terms "first, second, and so forth" are used to describe diverse constituent elements, such constituent elements are not limited by the terms. The terms are used only to discriminate a constituent element from other constituent elements. Accordingly, in the following description, a first constituent element may be a second constituent element.

Exemplary embodiments will hereinafter be described with reference to the accompanying drawings.

FIG. 1 is an exemplary diagram of a guide lamp for a vehicle, according to an exemplary embodiment of the invention. Referring to FIG. 1, a guide lamp 1 for a vehicle may include a plurality of lamp units 100 installed at the front left, front right, rear left and rear right sides, respectively, of a vehicle 10, a sensing unit 200 configured to sense a path change attempt (e.g., a lane change attempt) of the vehicle 10, and a controller 300 configured to operate the lamp units 100 based on the results of the sensing performed by the sensing unit 200 to generate a road beam pattern indicating the path change direction of the vehicle 10.

The path of the vehicle 10 may be changed to the left to make a left turn, to the right to make a right turn or to a rearward direction to make a reverse turn, for all of which the drivers of nearby vehicles or nearby pedestrians (especially those in blind spots) need guidance. In the exemplary embodiments of the invention, a path change attempt of the vehicle may include an attempt to change lanes and an attempt to make a turn at an intersection, but the invention is not limited thereto. In other words, the invention may be applicable to various other driving conditions than those set forth herein.

The lamp units 100 may be installed together with headlights. Each of the lamp units 100 may be configured to generate a plurality of beam patterns as a road beam pattern, indicating the direction toward the path change of the vehicle 10. In this exemplary embodiment, each of the lamp units 100 may be configured to generate a plurality of beam patterns, instead of using separate lamp units to generate a plurality of beam patterns. The lamp units 100 may be disposed at the front left, front right, rear left and rear right sides, respectively, of the vehicle 10, as illustrated in FIG. 1.

In addition, one or more of the lamp units 100 corresponding to the direction toward of the path change of the vehicle 10 may be operated to generate a road beam pattern. In this exemplary embodiment, the lamp units 100 may be configured to generate a road beam pattern indicating the direction toward the path change of the vehicle 10, but the invention is not limited thereto. In other words, the lamp units 100 and flashing lamp units such as, for example, turn signal lights may be used to indicate the direction toward the path change of the vehicle 10.

Figure 2:
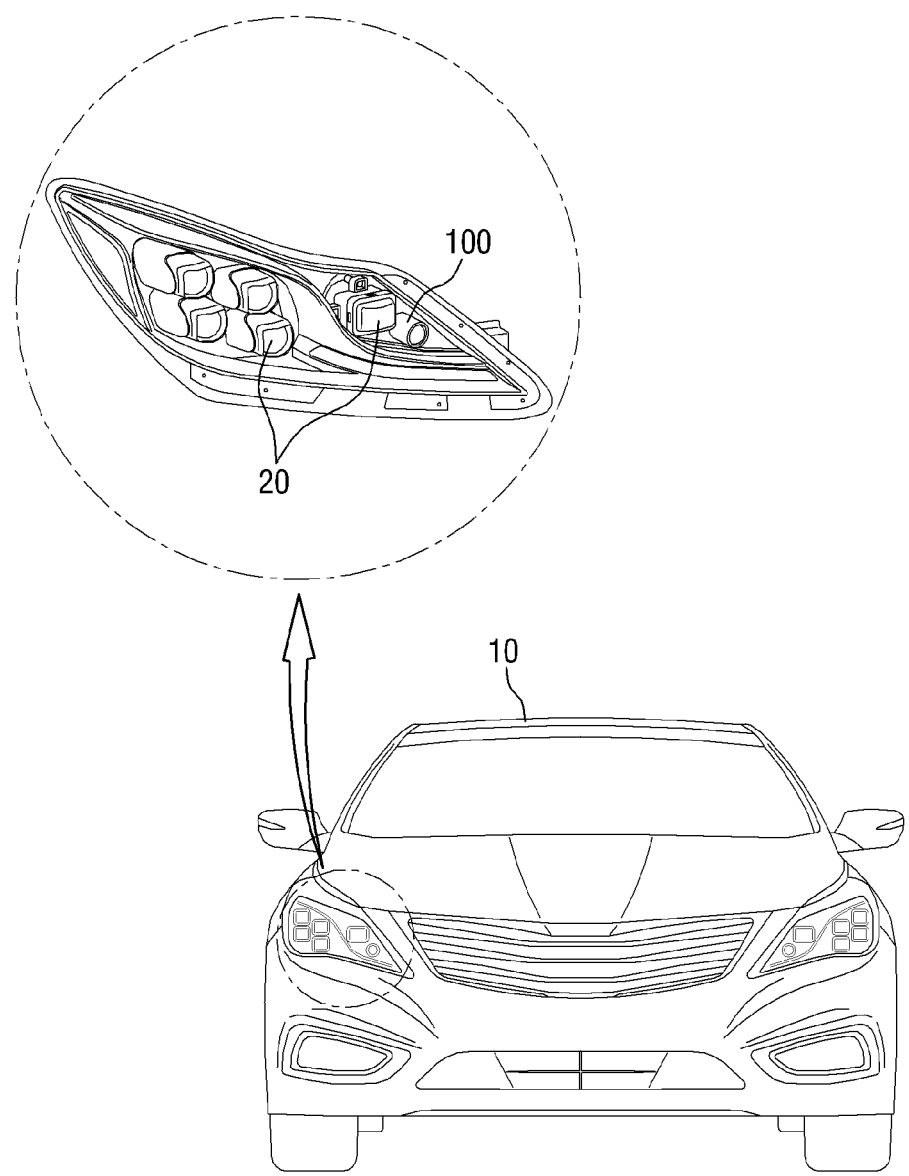
FIG. 2 is an exemplary diagram of a lamp unit according to a first exemplary embodiment of the invention.
Figure 3:
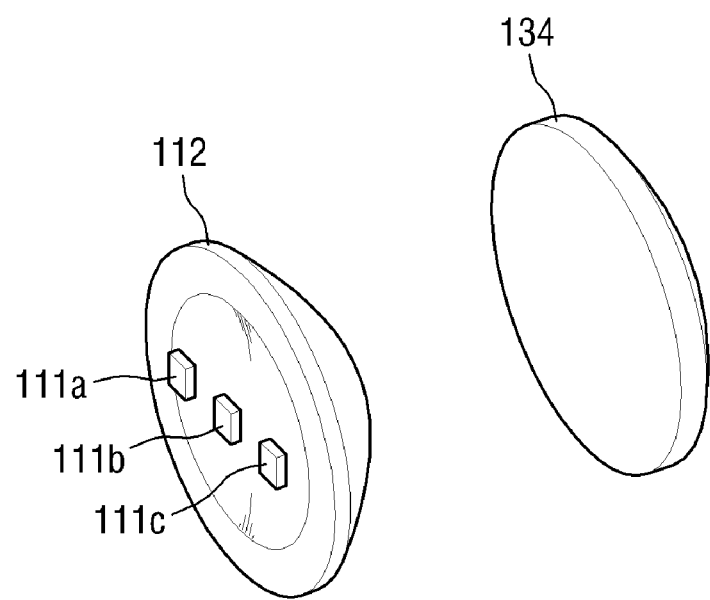
FIG. 3 is an exemplary view of the lamp unit according to the first exemplary embodiment of the invention.
Figure 4:
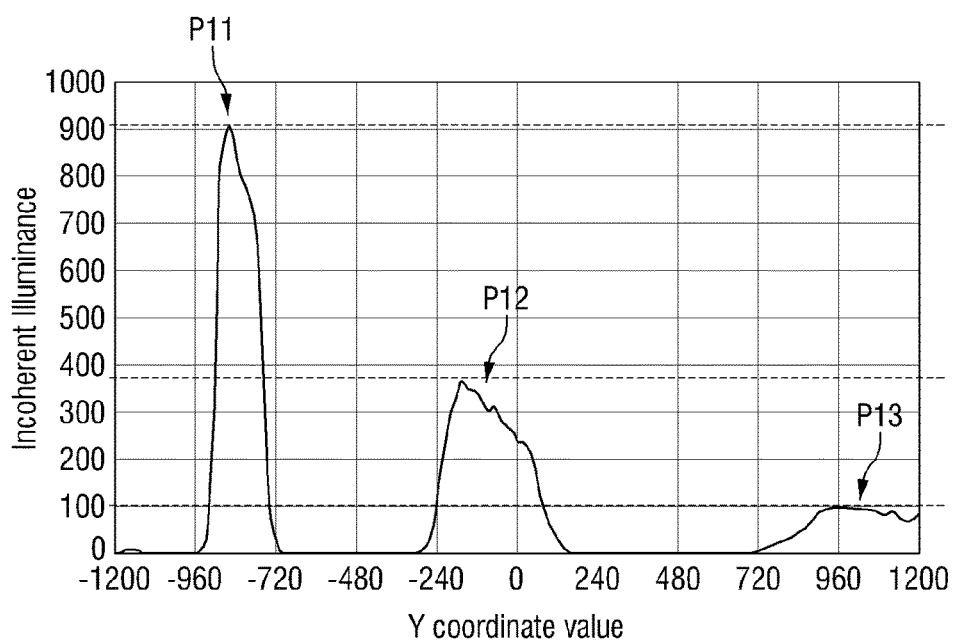
FIG. 4 is an exemplary graph illustrating the illuminance of road beam patterns generated on the surface of a road by the lamp unit according to the first exemplary embodiment of the invention.

FIG. 2 is an exemplary diagram of a lamp unit according to a first exemplary embodiment of the invention, FIG. 3 is an exemplary view of the lamp unit according to the first exemplary embodiment of the invention, and FIG. 4 is an exemplary graph illustrating the illuminance of road beam patterns generated on the surface of a road by the lamp unit according to the first exemplary embodiment of the invention. Referring to FIGS. 2 to 4, a lamp unit 100 may be installed at one side of a headlight 20, and may include a plurality of light sources 111a, 111b and 111c, a first lens 112 configured to collect light generated by the light sources 111a, 111b and 111c, and a second lens 113 configured to guide the collected light to travel substantially straight.

In the first exemplary embodiment, the light sources 111a, 111b and 111c may be used to generate a plurality of beam patterns P11, P12 and P13, respectively, as illustrated in FIG. 4. The illuminance, shape and size of each of the beam patterns P11, P12 and P13 may vary depending on the angle of installation or the curvature of at least one of the first lens 112 and the second lens 113. In the first exemplary embodiment, beams generated by the light sources 111a, 111b and 111c may be emitted through the first lens 112 and the second lens 113, instead of being emitted separately and individually, to generate the beam patterns P11, P12 and P13. Since the light sources 111a, 111b and 111c, the first lens 112 and the second lens 113 may be incorporated into a single lamp unit 100 and the single lamp unit 100 may be configured to generate a plurality of beam patterns, i.e., the beam patterns P11, P12 and P13, the structure of the lamp unit 100 may be simplified. In the first exemplary embodiment, a plurality of beam patterns, i.e., the beam patterns P11, P12 and P13, may be generated using a plurality of light sources, i.e., the light sources 111a, 111b and 111c, but the invention is not limited thereto. In other words, a single light source may be used to generate a plurality of beam patterns.

Figure 5:
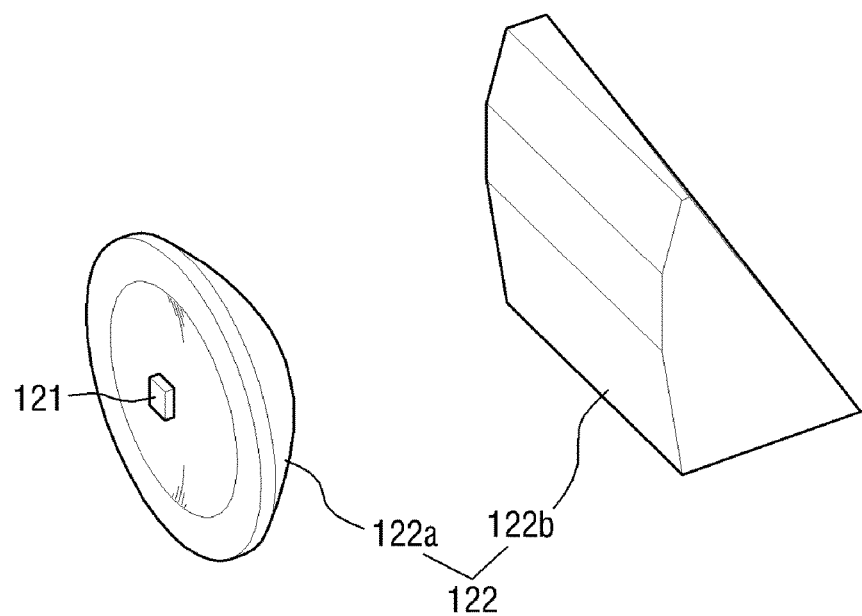
FIG. 5 is an exemplary view of a lamp unit according to a second exemplary embodiment of the invention.

FIG. 5 is an exemplary view of a lamp unit according to a second exemplary embodiment of the invention. Referring to FIG. 5, a lamp unit 100 may include a light source 121 and a light emitter 122 configured to emit light generated by the light source 121 in more than two different directions. In the description that follows, it is assumed that only one light source 121 is used.

The light emitter 122 may include a plurality of lenses 122a and 122, but the invention is not limited thereto. In other words, the light emitter 122 may include two lenses, i.e., a lens 122a configured to collect light and a lens 122b having a plurality of light emission regions. However, the light emitter 122 may use a single lens configured to collect light and to include a plurality of light emission regions, or may include a plurality of lenses 122b each having a plurality of light emission regions. Light incident upon the lens 122b may be emitted along different paths through the light emission regions of the lens 122b. In the second exemplary embodiment, a plurality of lenses, i.e., the lenses 122a and 122b may be used to generate a plurality of beam patterns, but the invention is not limited thereto. In other words, a prism lens, instead of a plurality of lenses, may be used.

Figure 6:
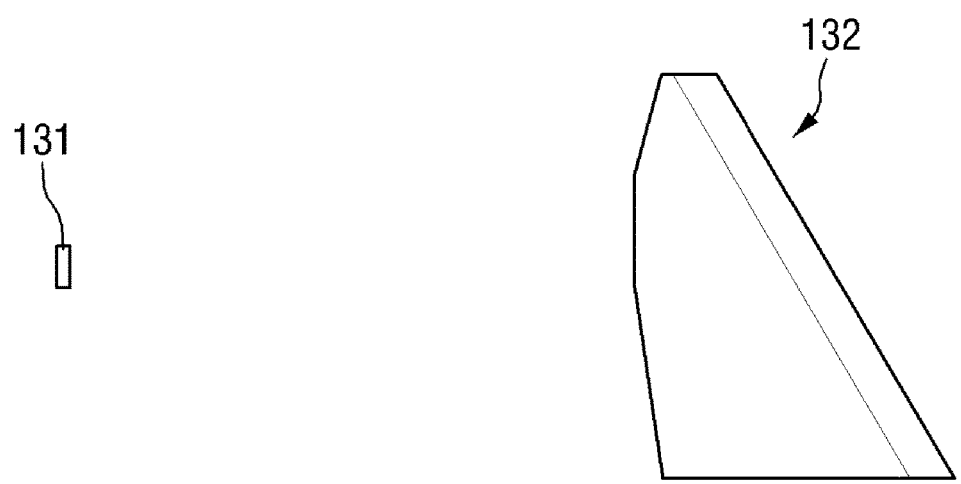
FIG. 6 is an exemplary view of a lamp unit according to a third exemplary embodiment of the invention.
Figure 7:
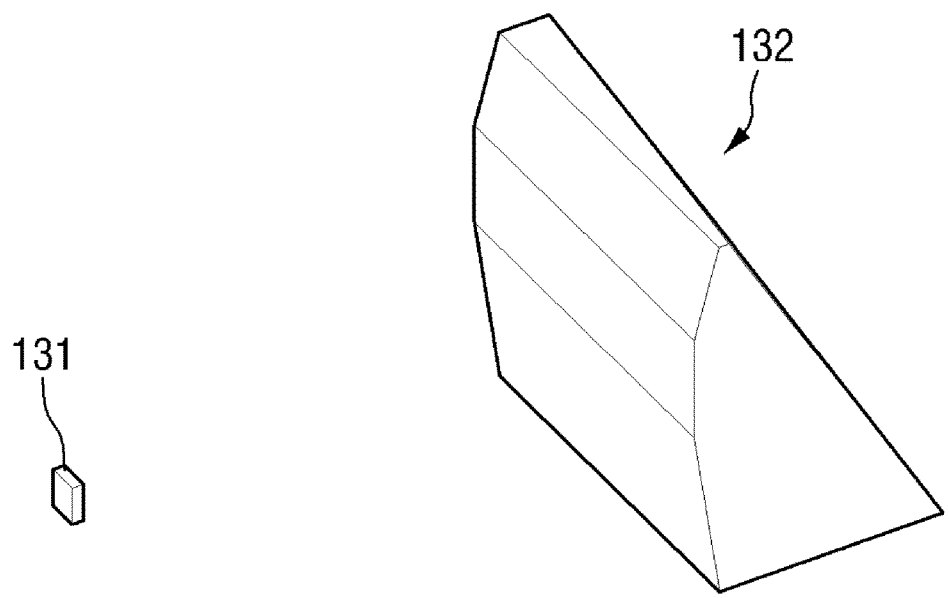
FIG. 7 is an exemplary side view of the lamp unit according to the third exemplary embodiment of the invention.

FIG. 6 is an exemplary view of a lamp unit according to a third exemplary embodiment of the invention and FIG. 7 is an exemplary side view of the lamp unit according to the third exemplary embodiment of the invention. Referring to FIGS. 6 and 7, a lamp unit 100 may include a light source 131 and a light emitter 132. The light emitter 132 may be a prism lens, and may include a light incidence surface configured to refract light incident thereupon from the light source 131 and a light emission surface configured to refract the refracted light from the light incidence to apply light onto the surface of a road ahead in the path of the vehicle 10. In the third exemplary embodiment, like in the second exemplary embodiment, one light source may be used.

One of the light incidence surface and the light emission surface of the light emitter 132 may include a first inclined surface having a predetermined angle with respect to a vertical direction from a longitudinal axis of the lamp unit 100, and the other surface of the light emitter 132 may include a plurality of second inclined surfaces having different angles with respect to the vertical direction. The second inclined surfaces may be sequentially connected to one another at different angles.

Figure 8:
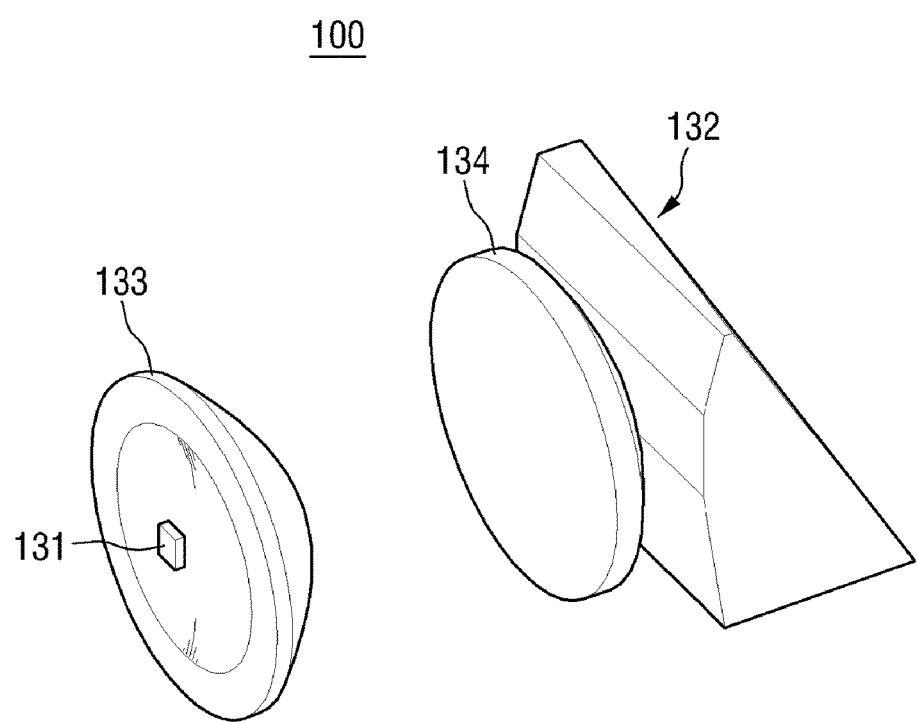
FIGS. 8 and 9 are exemplary side views of a plurality of lenses in the lamp unit according to the third exemplary embodiment of the invention.
Figure 9:
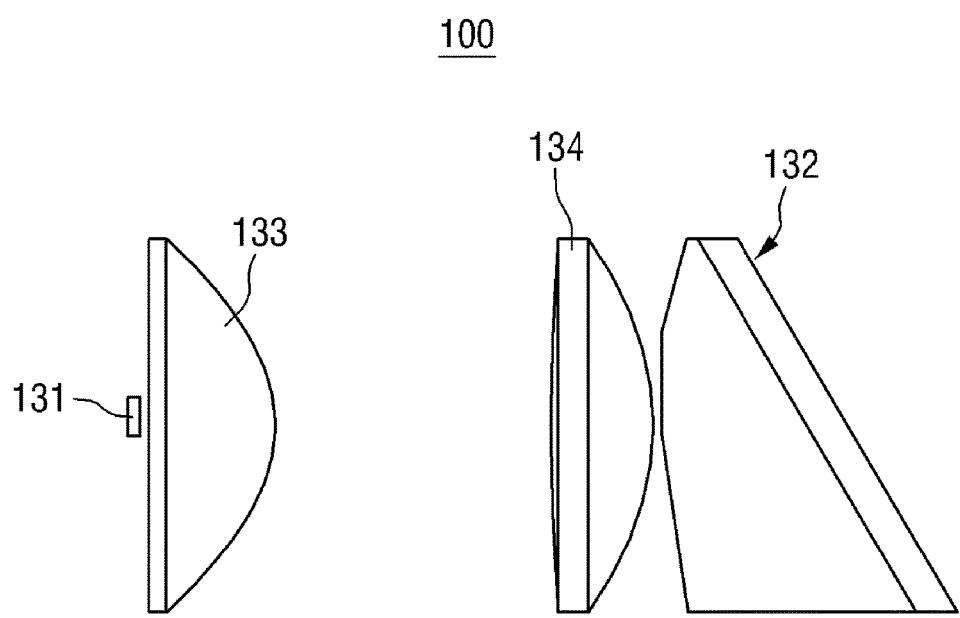

In the third exemplary embodiment, the light emitter 132 may be implemented as a prism lens, but the invention is not limited thereto. In other words, the light emitter 132, like its counterpart of the first exemplary embodiment, may include a first lens 133 configured to collect light emitted from the light source 131 and a second lens 134 configured to guide the collected light to travel substantially straight, as illustrated in FIGS. 8 and 9. In response to the light emitter 132 including the first lens 133 and the second lens 134, the first lens 133 may be configured to collect light emitted from the light source 131, and the collected light may be guided to travel substantially straight by the second lens 134. Accordingly, the optical efficiency of the light source 131 may be improved.

Figure 10:
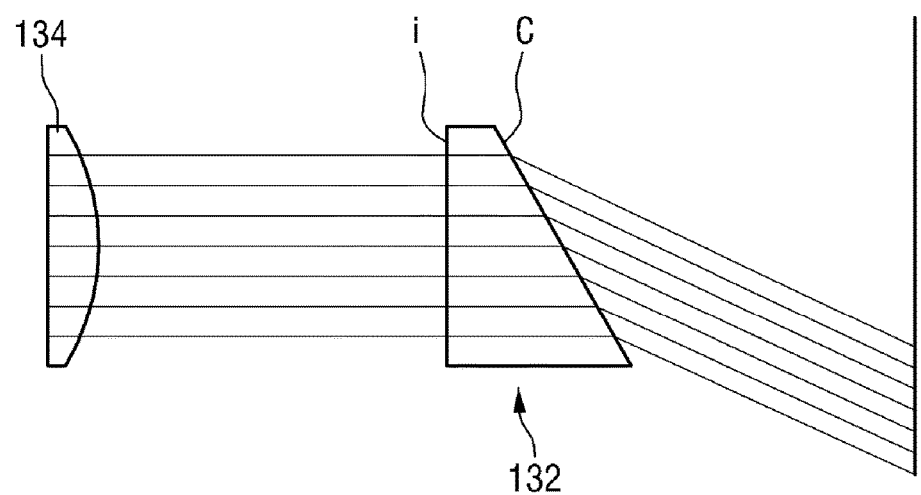
FIGS. 10 to 15 are exemplary diagrams illustrating examples of the paths of light transmitted through a light emitter in the lamp unit according to the third exemplary embodiment of the invention.

FIGS. 10 to 15 are exemplary diagrams illustrating examples of the paths of light transmitted through a light emitter in the lamp unit according to the third exemplary embodiment of the invention. Referring to FIG. 10, light transmitted through the second lens 134 may be incident upon a light incidence surface i of the light emitter 132 and may be refracted at a predetermined angle by a light emission surface C of the light emitter 132.

Figure 11:
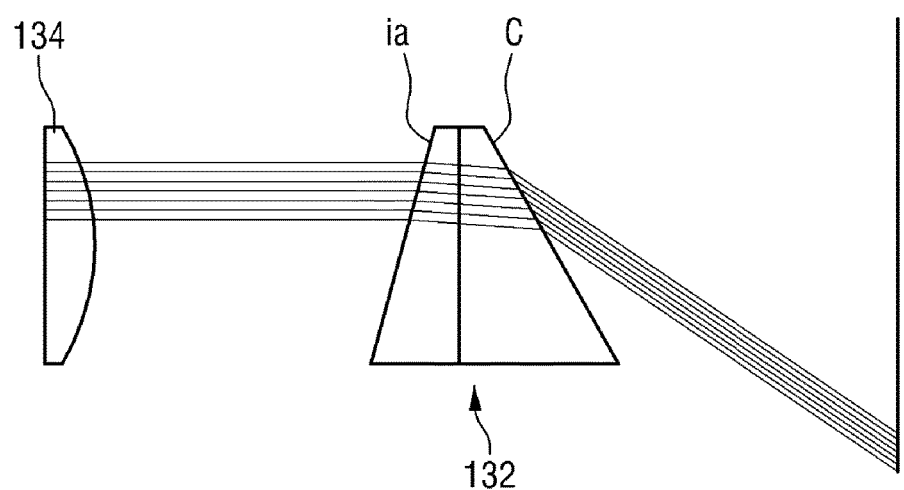
Figure 12:
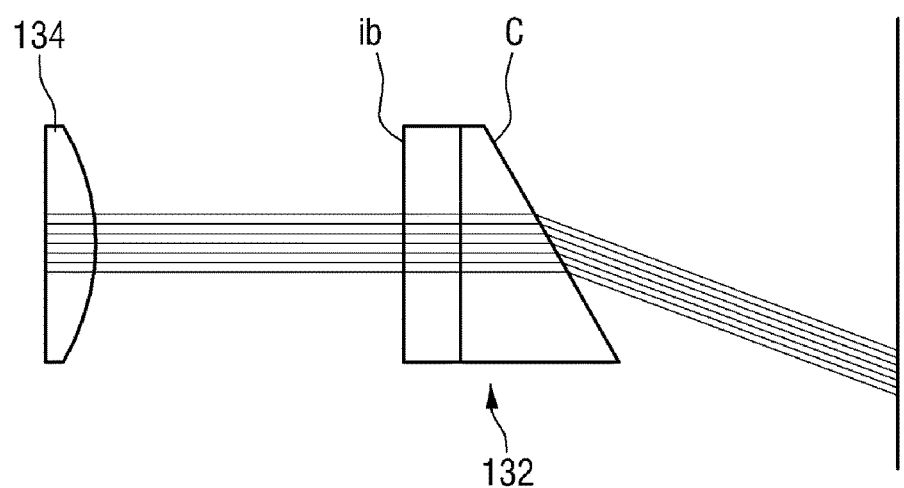
Figure 13:
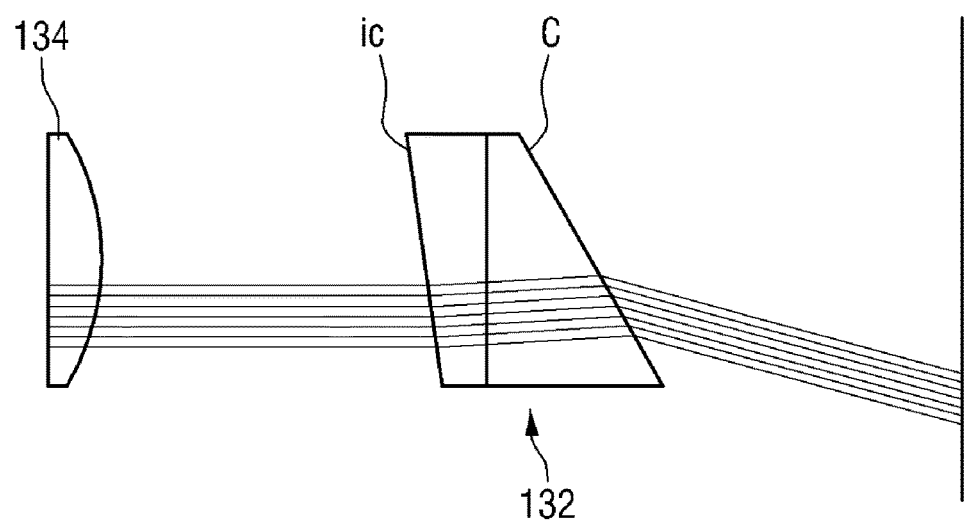

Referring to FIGS. 11 to 13, light transmitted through the second lens 134 may be incident upon, and refracted at a predetermined angle, by a light incidence surface ia, ib or is of the light emitter 132 and may then be refracted again at a predetermined angle by a light emission surface C of the light emitter 132. The angle at which light is refracted by the light incidence surface i or the light emission surface C of the light emitter 132 may satisfy Snell's law stating that the angle of refraction depends on the difference between the difference between the refractive indexes of two media, for example, the inside and the outside of the light emitter 132. More specifically, according to Snell's law, light may be refracted when passing through a boundary between two media with different refractive indexes since the velocity of light in each medium may vary from one medium to another medium, and the ratio of the refractive indexes of two media are inversely proportional to the sines ($\sin \theta$) of angles $\theta$ measured from the two media with respect to the normal of the boundary between the two media. For example, in response to the two media having refractive indexes n1 and n2, respectively, and the angles of incidence and refraction with respect to the normal of the boundary therebetween being θ1 and θ2, respectively, n1*sin θ1=n2*sin θ2.

Figure 14:
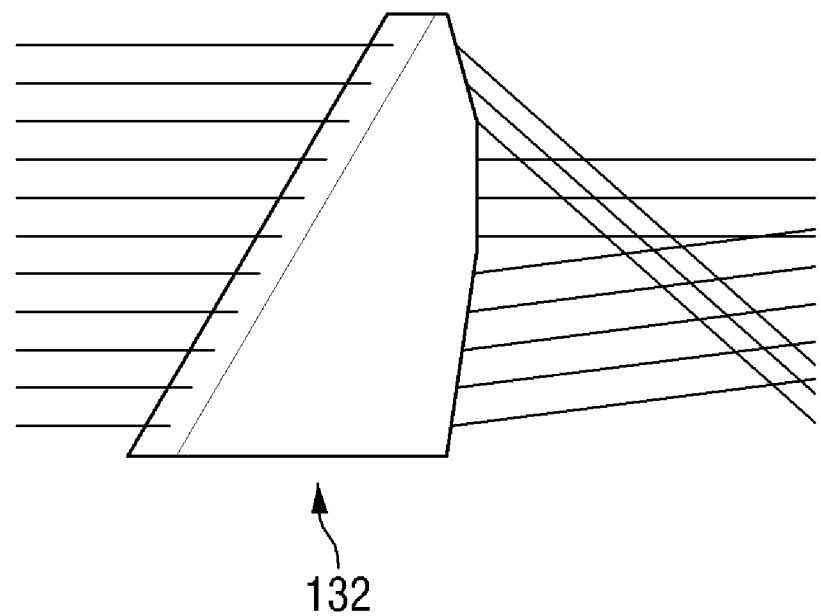

Referring to FIG. 14, light incident straight upon the light emitter 132 may be refracted at a substantially uniform angle by the light incidence surface of the light emitter 132, i.e., a first inclined surface, and may then be refracted at different angles by the light emission surface of the light emitter 132, i.e., a plurality of second inclined surfaces inclined at different angles with respect to the vertical direction and sequentially connected to one another at different angles.

Alternatively, the light incidence surface of the light emitter 132 may include the second inclined surfaces having different angles with respect to the vertical direction and sequentially connected to one another at different angles, and the light emission surface of the light emitter 132 may include the first inclined surface having a substantially uniform angle with respect to the vertical direction. The light emitter 132 is illustrated in FIG. 14 as including three second inclined surfaces refracting light in three different angles, but the invention is not limited thereto. The term "longitudinal axis", as used herein, may indicate the axis of light emitted from the light source 131. In other words, light incident upon the light emitter 132 may be refracted in the vertical direction, and may be refracted at different angles by the second inclined surfaces of the light emitter 132.

The second inclined surfaces of the light emitter 132 may be sequentially connected to one another, and the angles at which the second inclined surfaces of the light emitter 132 are connected to one another may include both positive and negative angles. The angle at which a pair of adjacent second inclined surfaces of the light emitter 132 are connected together may gradually decrease or increase from one side to another side of the light emitter 132 (e.g., from a first side to a second side). According to the third exemplary embodiment, since the lamp unit 100 may be configured to generate a plurality of beam patterns by using a single light source, i.e., the lamp unit 100 may be more cost effective, and may generate less heat, than when using a plurality of light sources.

Figure 15:
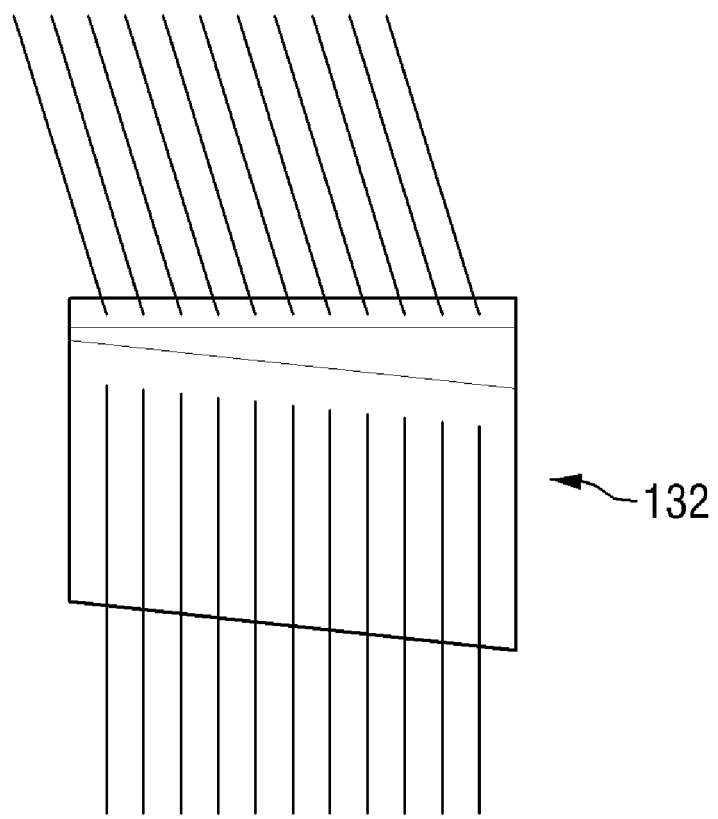

Referring to FIG. 15, the light incidence surface and the light emission surface of the light emitter 132 may have different angles with respect to a horizontal direction from the longitudinal axis. In other words, light incident upon the light emitter 132 may be refracted in the vertical direction and in the horizontal direction. In the example illustrated in FIG. 15, even when the lamp unit 100 is not disposed to face a direction toward which to apply guide beams, guide beams may be generated at a desired location by adjusting the direction of light refracted and emitted from the lamp unit 100. Accordingly, unity in the appearance of the vehicle 10 may be improved. Therefore, various problems that may be faced by the lamp unit 100, such as spatial restrictions and increases in the number of parts and the manufacturing cost of the lamp unit 100, may be addressed.

Figure 16:
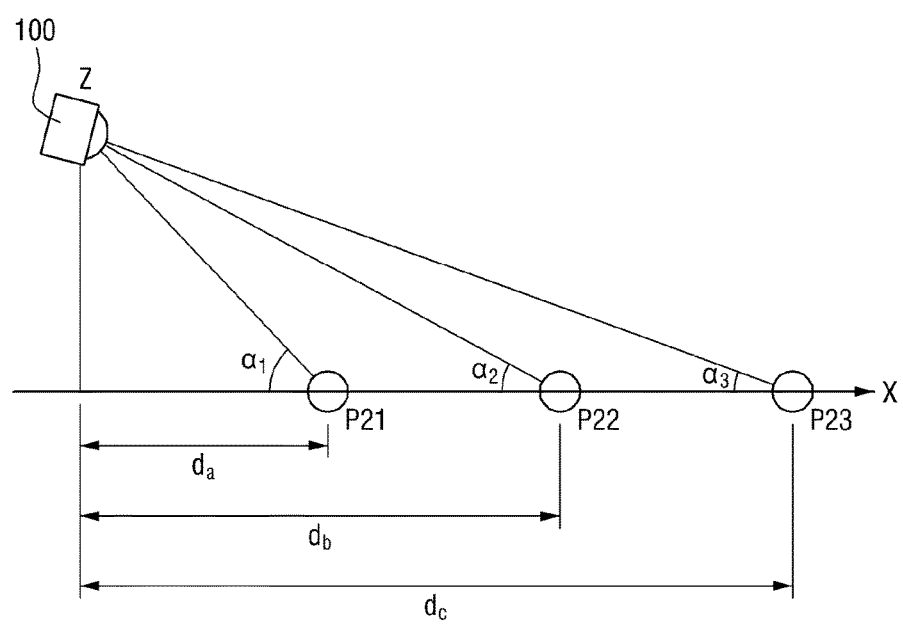
FIG. 16 is an exemplary diagram illustrating the pattern of light emitted from the lamp unit according to the third exemplary embodiment of the invention.
Figure 17:
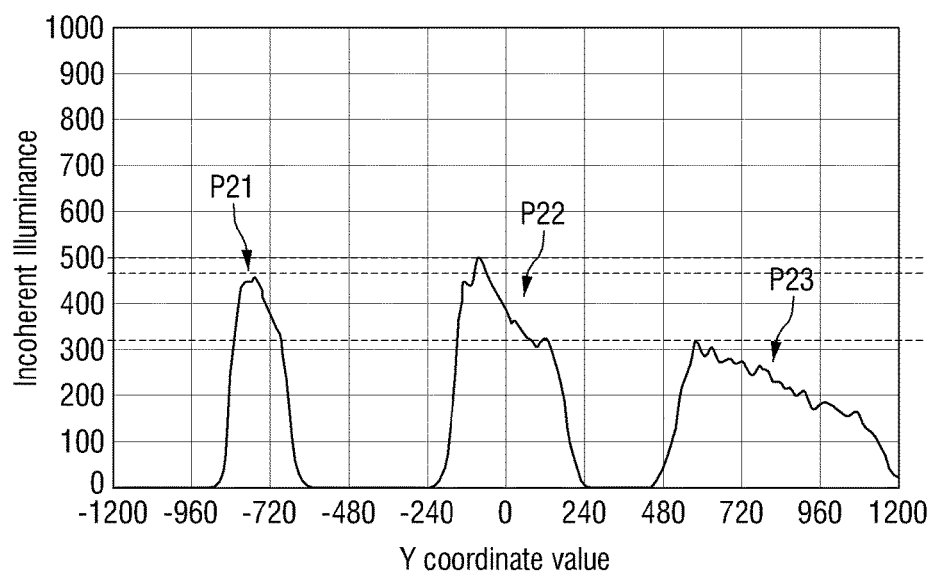
FIG. 17 is an exemplary graph illustrating the illuminance of road beam patterns generated on the surface of a road by the lamp unit according to the third exemplary embodiment of the invention.

FIG. 16 is an exemplary diagram illustrating the pattern of light emitted from the lamp unit according to the third exemplary embodiment of the invention, and FIG. 17 is an exemplary graph illustrating the illuminance of road beam patterns generated on the surface of a road by the lamp unit according to the third exemplary embodiment of the invention. Referring to FIGS. 16 and 17, the lamp unit 300 may have a plurality of second inclined surfaces with different areas, and may thus be able to generate a plurality of beam patterns (i.e., the beam patterns P21, P22 and P23) applied onto the surface of a road with a uniform illuminance. Of the plurality of second inclined surfaces, a second inclined surface with a largest area may correspond to a beam pattern at a farthest distance from the vehicle 10, i.e., the beam pattern P23.

In the example of FIG. 17, each of the beam patterns P21, P22 and P23 may have a substantially uniform illuminance, but the invention is not limited thereto. In other words, the illuminance of each of the beam patterns P21, P22 and P23 may be set to vary depending on the inclination angle or area of the first inclined surface of the lamp unit 300 or the inclination angles or areas of the second inclined surfaces of the lamp unit 300.

By adjusting the area of light incident upon, or emitted from, the second inclined surfaces of the lamp unit 300, which may serve as light incidence surfaces or light emission surfaces and have different angles from one another with respect to the vertical direction, the beam patterns P21, P22 and P23 may be generated at locations apart from the vehicle 10 by distances $d_a$, $d_b$, and $d_c$, respectively. The beam patterns P21, P22 and P23 may have a more uniform illuminance than those obtained using a plurality of light sources. Angles $\alpha_1$, $\alpha_2$ and $\alpha_3$ formed by the lamp unit 100 and the locations of the beam patterns P21, P22 and P23, respectively, may vary depending on the angles of the second inclined surfaces of the lamp unit 100 with respect to the vertical direction, and may be calculated based on the principle that the illuminance of light from a light source is inversely proportional to the square of the distance from the light source.

Figure 18:
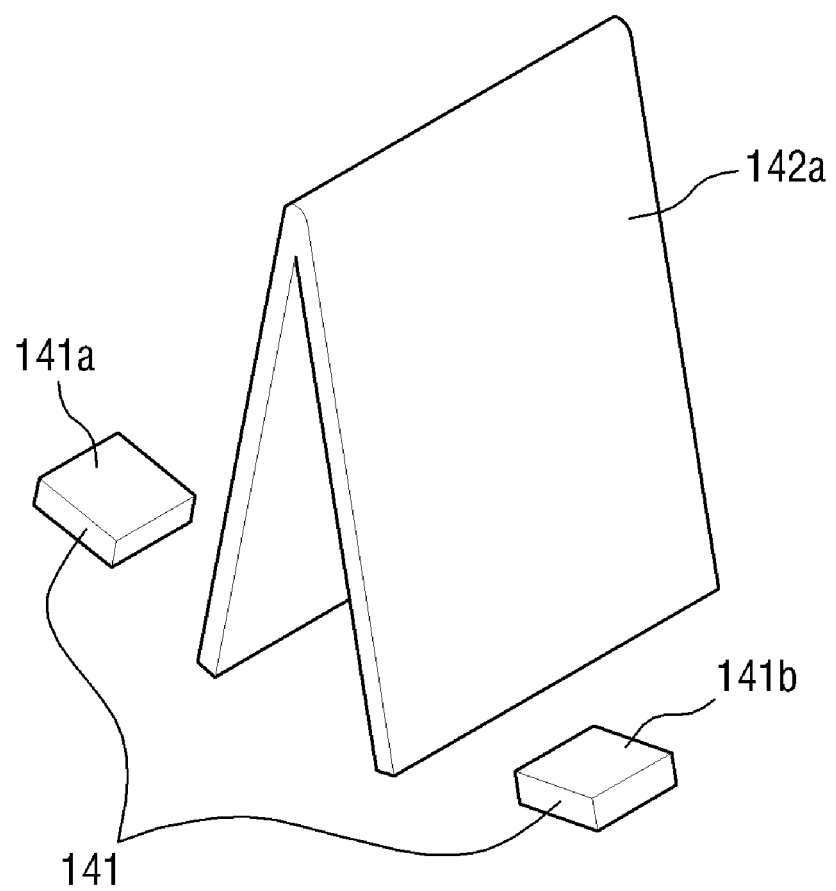
FIG. 18 is an exemplary view of a lamp unit according to a fourth exemplary embodiment of the invention.
Figure 19:
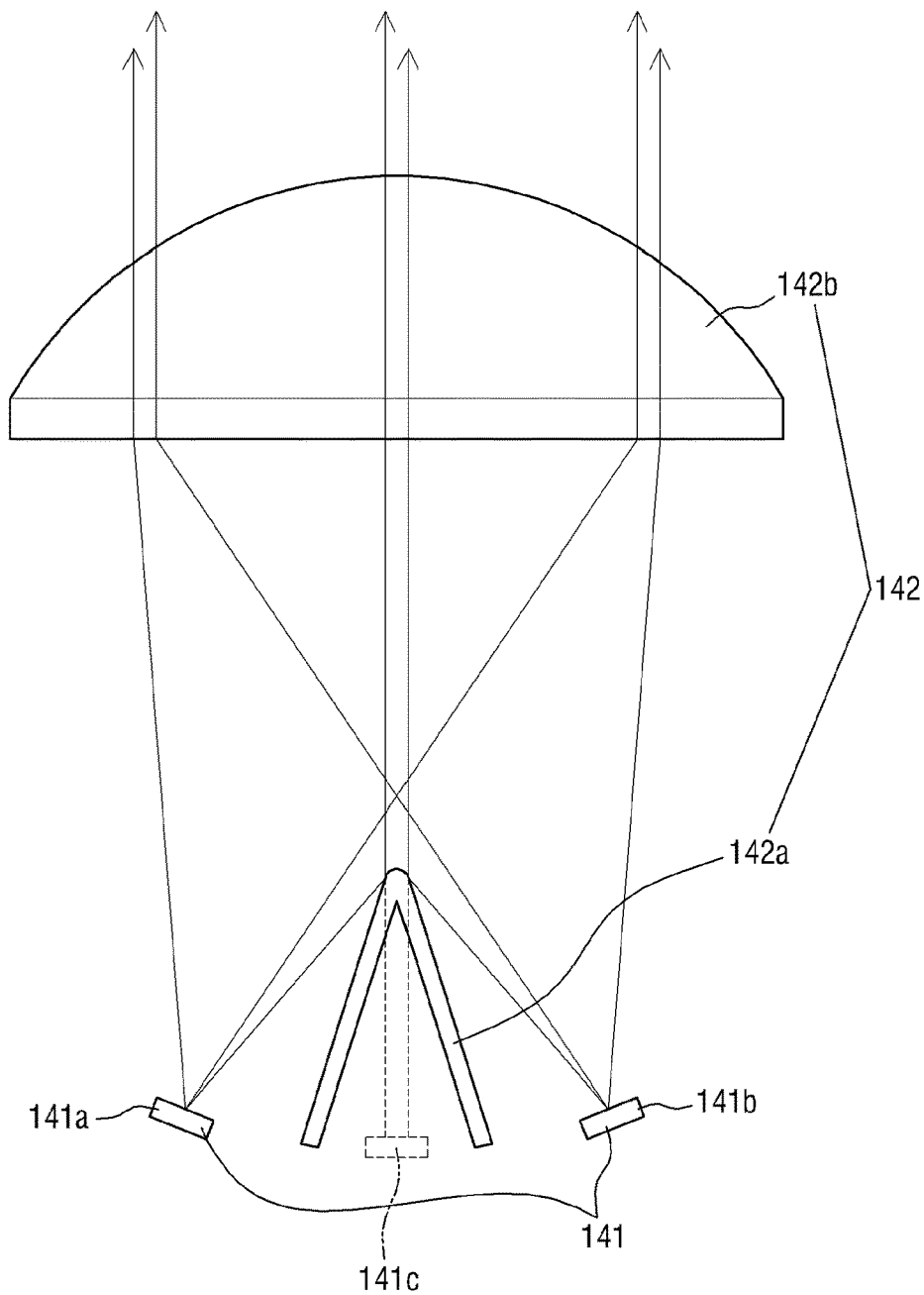
FIG. 19 is an exemplary diagram illustrating the paths of light in the lamp unit according to the fourth exemplary embodiment of the invention.

FIG. 18 is an exemplary view of a lamp unit according to a fourth exemplary embodiment of the invention and FIG. 19 is an exemplary diagram illustrating the paths of light in the lamp unit according to the fourth exemplary embodiment of the invention. Referring to FIGS. 18 and 19, a lamp unit 100 may include a light source unit 141 and a light emitter 142, and the light emitter 142 may include a reflector 142a and a lens 142b. In the fourth exemplary embodiment, like in the second or third exemplary embodiment, the lamp unit 100 may be configured to generate alone a plurality of beam patterns as a road beam pattern.

The light source unit 141 may include one or more light sources 141a and 141b. In the fourth exemplary embodiment, the light source unit 141 may include two light sources disposed at different locations, i.e., the first light source 141a and the second light source 141b, but the invention is not limited thereto. In other words, the number of light sources included in the light source unit 141 may vary depending on the number and illuminance of beam patterns to be generated.

The reflector 142a may be configured to reflect, and thus direct, light emitted from the light source unit 141 toward a desired location. More specifically, the reflector 142a may be disposed near (e.g., adjacent to) the light source unit 141, and may be configured to reflect, and thus direct, light emitted from the first light source 141a and the second light source 141b, respectively, toward a single desired location. In other words, light from the first light source 141a and light from the second light source 141b may be directed toward about the same location by the reflector 142a.

The lens 142b may be configured to transmit therethrough direct light from the light source unit 141 incident thereupon through a plurality of incidence regions thereof and also reflected light from the reflector 142a, thereby generating a road beam pattern that indicates the direction toward which the path change of the vehicle 10 on the surface of a road. The reflected light from the reflector 142a may be directed toward about the same incidence region of the lens 142b, and the corresponding incidence region of the lens 142b will hereinafter be referred to as a first incidence region.

As illustrated in FIGS. 18 and 19, the reflector 142a may include two reflective plates configured to reflect light from the first light source 141a and light from the second light source 141b, respectively. The positions and postures of the first light source 141a and the second light source 141b and the angle between, and the size of, the two reflective plates of the reflector 142a may be appropriately determined to reflect and direct light from the first light source 141a and light from the second light source 141b toward about the same location. Light emitted from the light source unit 141 may be directly applied to the lens 142b, or may be reflected by the reflector 142a and then applied to the lens 142b. For example, as illustrated in FIG. 19, light emitted from a single light source may be incident upon the lens 142b through more than one incidence region of the lens 142b.

The incidence regions of the lens 142b may include a first incidence region, a second incidence region, and a third incidence region. The first incidence region may be a region configured to receive reflected light obtained by reflecting light generated by the first light source 141a and reflected light obtained by reflecting light generated by the second light source 141b from the reflector 142a, and the second incidence region and the third incidence region may be regions configured to receive direct light from the first light source 141a and the second light source 141b. In other words, referring to FIG. 19, the first incidence region that receives reflected light from the reflector 142a may be disposed at about the center of the lens 142b, and the second incidence region and the third incidence region that receive direct light from the first light source 141a and the second light source 141b may be disposed at either side of the lens 142b.

Further, beams of light transmitted through the lens 142b through different incidence regions of the lens 142b may form separate beam patterns. A beam pattern obtained by the presence of the reflector 142a may be an additional beam pattern. Light emitted from the first light source 141a and light emitted from the second light source 141b may be separately incident upon two different incidence regions of the lens 142b, and as a result, two beam patterns may be generated. Another beam pattern may be generated by reflected light from the reflector 142a, obtained from the light emitted from the first light source 141a or the second light source 141b. Accordingly, three beam patterns may be generated using two light sources, i.e., the first light source 141a and the second light source 141b thus providing the benefits of the presence of an additional light source.

Referring to FIG. 19, reference numeral 141c indicates an imaginary light source that is not actually present, but may provide the benefits of a light source. According to the fourth exemplary embodiment, three beam patterns may be generated using two light sources, i.e., the first light source 141a and the second light source 141b. Thus, it may be possible to generate more beam patterns than there are light sources.

Figure 20:
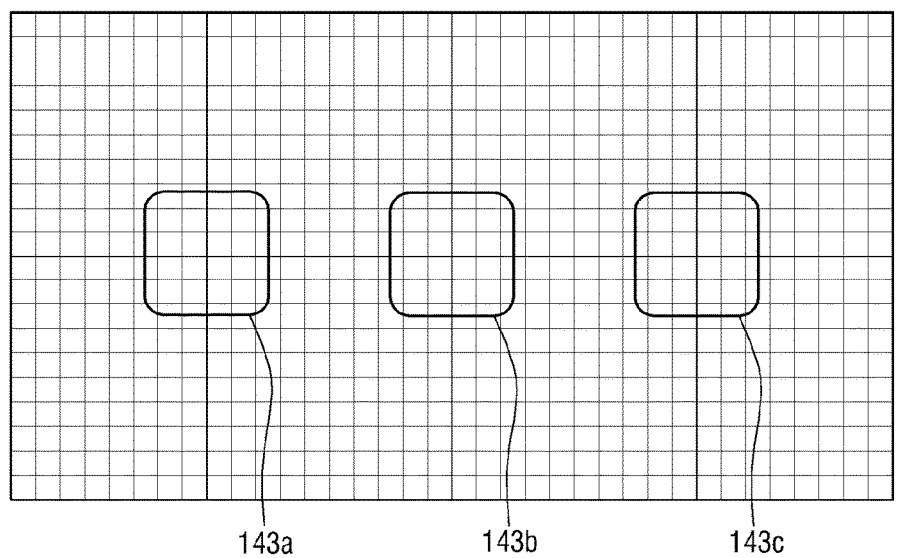
FIG. 20 is an exemplary diagram illustrating beam patterns projected onto a screen by the lamp unit according to the fourth exemplary embodiment of the invention.

FIG. 20 is an exemplary diagram illustrating beam patterns projected onto a screen by the lamp unit according to the fourth exemplary embodiment of the invention. Referring to FIG. 20, direct light from the light source unit 141 may be transmitted through the lens 142b through either side of the lens 142b, and reflected light from the reflector 142a may be transmitted through the lens 142b through the substantially center of the lens 142b.

In addition, beam patterns 143a and 143c on the left and right sides of a beam pattern 143b may be interpreted as being generated by the direct light from the light source unit 141, and the beam pattern 143b in the substantially middle may be interpreted as being generated by the imaginary light source 141c. The distance between the beam pattern 143b and the beam pattern 143a or 143c may vary depending on the distance between the center of the reflector 142a where the imaginary light source 141c is located and the first or second light source 141a or 141b. As the distance between the center of the reflector 142a and the first or second light source 141a or 141b decreases, the distance between the beam pattern 143b and the beam pattern 143a or 143c may also decrease. Further, as the distance between the center of the reflector 142a and the first or second light source 141a or 141b increases, the distance between the beam pattern 143b and the beam pattern 143a or 143c may also increase.

The brightness and the size of the beam patterns 143a, 143b and 143c may be determined by the angle between the two reflective plates of the reflector 142a, the distance between the lens 142b and the adjoining ends of the two reflective plates of the reflector 142a, and the angle of emission of light from the first or second light source 141a or 141b. In the fourth exemplary embodiment, light may be directly applied from the first or second light source 141a or 141b, and the beam patterns 143a, 143b and 143c may be generated in substantially clear shapes. In other words, the beam patterns 143a, 143b and 143c may be generated to have relatively sharp edges (e.g., may be prevented from being blurry). To generate beam patterns with sharp edges, an imaging optical lens may be used as the lens 142b to allow light incident thereupon to travel substantially straight without being scattered. However, it may be difficult to generate beam patterns with sharp edges simply by making light incident upon the lens 142b travel substantially straight. Accordingly, in a variation of the fourth exemplary embodiment, the lamp unit 100 may also include additional lenses 142c, as illustrated in FIG. 21.

Figure 21:
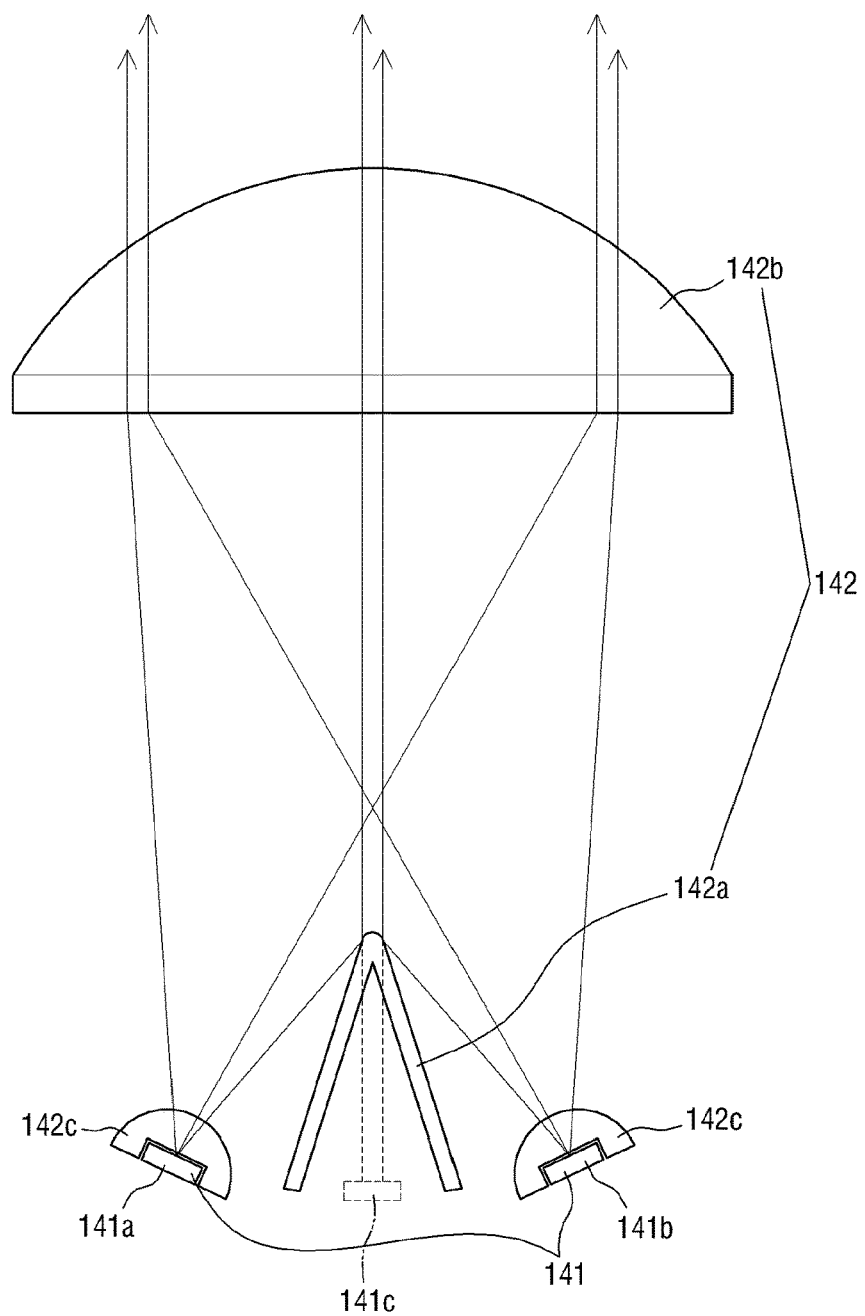
FIG. 21 is an exemplary diagram of a variation of the lamp unit according to the fourth exemplary embodiment of the invention, further including an additional lens.

Referring to FIG. 21, the additional lenses 142c may be provided separately for the first light source 141a and the second light source 141b. More specifically, each of the additional lenses 142c may include a groove, and the first light source 141a and the second light source 141b may be disposed in the grooves of the additional lenses 142c. Due to the presence of the additional lenses 142c, scattering of light may be prevented, and as a result, light may be properly collected by the lens 142b. Accordingly, it may be possible to generate guide beams with sharper edges (e.g., may be possible to prevent blurry light).

The light emitters 122, 132 and 142 of the second, third and fourth exemplary embodiments may have different structures from one another, but may perform similar functions such as allowing light to be emitted in a plurality of directions to generate a plurality of beam patterns. The sensing unit 200 may be configured to sense a path change attempt of the vehicle 10 based on a manipulation by the driver of the vehicle 10 or the driving state of the vehicle 10. In an example, in response to a manipulation of a manipulation lever for turn signal lights being detected, the sensing unit 200, executed by the controller 300, may be configured to determine that a path change attempt of the vehicle 10. In an alternative example, in response to the vehicle 10 being driven while crossing or stepping (e.g., driving on a lane separation line) on a line between two lanes, the sensing unit 200 may be configured to determine a path change attempt of the vehicle 10. However, the invention is not limited to these examples.

The sensing unit 200 may include an imaging device (e.g., a camera, video camera, etc.) (not illustrated) configured to detect the lines between lanes to sense a path change attempt of the vehicle 10. In response to an image captured by the imaging device showing that the vehicle 10 is being driven while crossing on a line between two lanes, the sensing unit 200 may be configured to determine the path change attempt of the vehicle 10. In response to the analysis of a manipulation of the manipulation lever for turn signal lights and the detection of whether the lines between lanes are being driven on by the vehicle 10 leading to different conclusions as to the direction toward the path change of the vehicle, the sensing unit 100 may be configured to determine the direction toward the path change of the vehicle 10, according to predetermined priorities.

More specifically, when a first direction obtained from the analysis of a manipulation of the manipulation lever for turn signal lights differs from a second direction obtained from the detection of whether a line between two lanes is being stepped on or crossed by the vehicle 10, the sensing unit 200 may be configured to select one of the first direction and the second direction as the direction toward the path change of the vehicle 10 according to priorities between the first direction and the second direction.

The controller 300 may be configured to determine the direction toward the path change of the vehicle 10 based on the results of sensing performed by the sensing unit 200, and may be configured to operate the lamp unit 100 based on the results of the determination. For example, in response to a determination that the vehicle 10 is attempting to make a right turn at an intersection, the controller 300 may be configured to supply a current to the lamp unit 100 on the front right side of the vehicle 10 to generate a road beam pattern including a plurality of beam patterns. In the first through fourth exemplary embodiments, a plurality of beam patterns may be generated simultaneously to a road beam pattern, but the invention is not limited thereto. In other words, the controller 300 may be configured to sequentially supply a current to the light sources of each lamp unit 100 in a predetermined order to sequentially generate a plurality of beam patterns as a road beam pattern, or may be configured to repeatedly supply a current to, and then cut off the current from, each lamp unit 100 to output a flashing light from the corresponding lamp 100.

Figure 22:
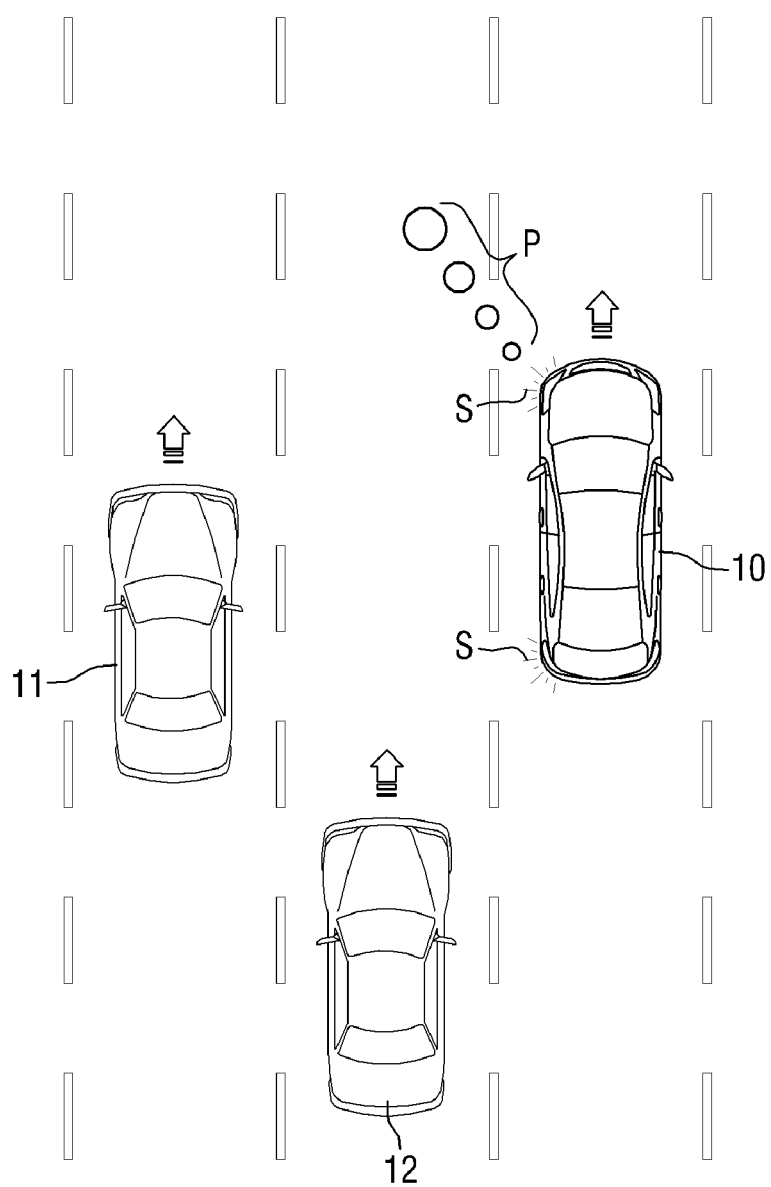
FIGS. 22 and 23 are exemplary diagrams illustrating a road beam pattern generated in response to a lane change attempt of a vehicle.
Figure 23:
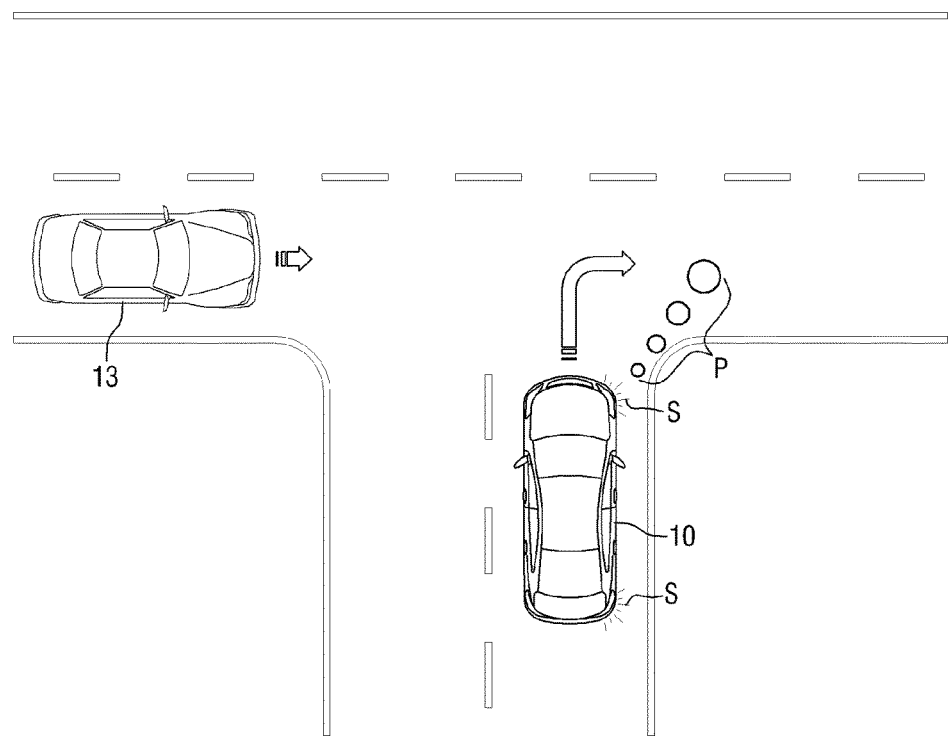

FIGS. 22 and 23 are exemplary diagrams illustrating examples of a road beam pattern generated in response to a path change attempt of a vehicle. More specifically, FIG. 22 illustrates an exemplary road beam pattern generated in response to a path change attempt to change lanes. Referring to FIG. 22, in response to the vehicle 10 (e.g., the subject vehicle) attempting to change lanes while turning on turn signal lights S, the driver of a vehicle 12 (e.g., a third vehicle) on the rear left side of the vehicle 10 may identify a left lane change of the vehicle 10, but the driver of a vehicle 11 (e.g., a second vehicle) almost side-by-side to the vehicle 10 may not (e.g., the driver of vehicle 11 may be obstructed from viewing the turn signals due to be located in a blind spot). Accordingly, a road beam pattern P may be changed to be generated by, for example, the lamp unit 100 on the front left side of the vehicle 10, indicating the direction toward which the path of the vehicle 10. Accordingly, vehicle 10, disposed in a blind spot of vehicle 11, may be notified of the lane change of vehicle 11.

Since the road beam pattern P may be more easily recognizable even to the driver of the vehicle 11, it may be possible to avoid accidents that may be caused by two vehicles simultaneously attempt to change to a same road lane or a vehicle suddenly cutting in (e.g., entering into the lane of the subject vehicle). In the example illustrated in FIG. 22, the lamp unit 100 on the front left side of the vehicle 10 may be used to generate the road beam pattern P, but the invention is not limited thereto. In other words, the lamp units 100 on the front and rear left sides of the vehicle 10 may both be used.

FIG. 22 illustrates an exemplary road beam pattern generated in response to a right turn attempt. Referring to FIG. 23, in response to the vehicle 10 attempting to make a right turn, a road beam pattern P may be generated, indicating the direction toward the path change of the vehicle 10. As a result, a vehicle 13 (e.g., a vehicle traveling in the vicinity of the subject vehicle, a fourth vehicle etc.) that the vehicle 10 is about to cut in front of, may more easily recognize the road beam pattern P ahead, thereby avoiding a collision with the subject vehicle 10.

In the examples of FIGS. 22 and 23, the size of beam patterns included in a road beam pattern P may gradually increase from a nearest beam pattern to a farthest beam pattern from the vehicle 10, but the invention is not limited thereto. In an alternative example, the size of beam patterns included in a road beam pattern P may gradually increase from the farthest beam pattern to the nearest beam pattern from the vehicle 10. The size of beam patterns included in a road beam pattern may be set in various manners, other than those set forth herein.

In the examples of FIGS. 22 and 23, a road beam pattern P may be generated to have a predetermined angle, for example, an acute angle, with the longitudinal central axis of the vehicle 10, but the invention is not limited thereto. In other words, the angle between a road beam pattern P and the longitudinal central axis of the vehicle 10 may be determined through various tests such that the road beam pattern P may become most easily recognizable. The angle between a road beam pattern P and the longitudinal central axis of the vehicle 10 may be determined in advance upon the manufacturing of the vehicle 10 or by the driver of the vehicle 10.

While the invention has been particularly shown and described with reference to exemplary embodiments thereof, it will be understood by those of ordinary skill in the art that various changes in provide and detail may be made therein without departing from the spirit and scope of the invention as defined by the following claims. The exemplary embodiments should be considered in a descriptive sense only and not for purposes of limitation.

What is claimed is:

1. A guide lamp for a vehicle, comprising:
 a sensing unit configured to sense a path change attempt of the vehicle; and
 a lamp unit configured to generate a road beam pattern on a surface of a road indicating a direction toward the path change attempt of the vehicle,
 wherein the lamp unit includes a light source and a light emitter configured to generate the road beam pattern by emitting light generated by the light source in two or more different directions,
 wherein the light emitter includes a prism lens having an incidence surface and an emission surface,
 wherein one of the incidence surface or the emission surface of the prism lens has a plurality of surfaces with different angles and different areas with respect to a vertical direction from a longitudinal axis of the lamp unit,
 wherein the road beam pattern includes a plurality of discrete beam patterns each having a predetermined shape and aligned in one direction,
 wherein light emitted by the light source that is transmitted through a surface of the plurality of surfaces having a largest area among the different areas of the plurality of surfaces a beam pattern among the plurality of beam patterns that is at a farthest distance from the vehicle along the longitudinal axis of the lamp unit, and wherein the plurality of surfaces with different areas apply the plurality of beam patterns with a substantially uniform illuminance onto the surface of the road.

2. The guide lamp of claim 1, wherein the path change attempt of the vehicle includes at least one of a lane change attempt and a turn attempt at an intersection.

3. The guide lamp of claim 1 wherein the size of the beam patterns gradually increases or decreases from a nearest beam pattern to a farthest beam pattern from the vehicle.

4. The guide lamp of claim 1, wherein the road beam pattern forms a predetermined angle with a longitudinal central axis of the vehicle and the predetermined angle is an acute angle.

5. The guide lamp of claim 1, wherein the light emitter includes a plurality of light emission regions through which the light generated by the light source is emitted.

6. The guide lamp of claim 5, wherein the light emitter includes a first lens configured to collect the light generated by the light source and a second lens configured to guide the collected light to travel substantially straight.

7. The guide lamp of claim 5, wherein the light emitter includes one or more lenses configured to emit the light generated by the light source in two or more different directions.

8. The guide lamp of claim 7, wherein the prism lens includes:

the incidence surface configured to refract light incident from the light source; and the emission surface configured to refract the refracted light from the incidence surface to apply light onto the surface of a road ahead in the path of the vehicle, wherein one of the incidence surface and the emission surface of the prism lens includes a first inclined surface having a substantially uniform angle with respect to a vertical direction from a longitudinal axis of the lamp unit, and wherein an other surface of the prism lens includes a plurality of second inclined surfaces having different angles with respect to the vertical direction and sequentially connected to one another at different angles.

9. The guide lamp of claim 8, wherein the incidence surface and the emission surface of the prism lens have different angles with respect to a horizontal direction from the longitudinal axis.

10. The guide lamp of claim 8, wherein the second inclined surfaces have different areas to apply the plurality of beam patterns with a substantially uniform illuminance onto the surface of the road.

* * * * *